United States Patent [19]

Jacq et al.

[11] 4,336,590

[45] Jun. 22, 1982

[54] DEVICES FOR CONTROLLING GAS FLOWS

[75] Inventors: Georges Jacq, Maurepas; Pierre Damico, Villepreux, both of France

[73] Assignee: Intertechnique, Plaisir, France

[21] Appl. No.: 145,844

[22] Filed: May 1, 1980

[30] Foreign Application Priority Data

May 2, 1979 [FR] France ................................ 79 11072

[51] Int. Cl.³ ................................................ A62B 7/14
[52] U.S. Cl. ................................... 364/418; 364/510; 73/23; 128/1 A; 128/204.22
[58] Field of Search ........................ 364/413, 418, 510; 128/204.21, 204.22, 205.11, 205.24, 205.25, 1 A; 73/3, 23, 199

[56] References Cited

U.S. PATENT DOCUMENTS

| | | | |
|---|---|---|---|
| 3,878,376 | 4/1975 | Sholes, Jr. et al. | 364/558 X |
| 3,896,792 | 7/1975 | Vali et al. | 73/23 X |
| 3,972,327 | 8/1976 | Ernst et al. | 128/204.21 |
| 3,977,394 | 8/1976 | Jones et al. | 364/415 X |
| 3,991,304 | 11/1976 | Hillsman | 364/415 |
| 4,109,509 | 8/1978 | Cramer et al. | 128/204.22 X |
| 4,121,578 | 10/1978 | Torzala | 128/205.11 X |
| 4,215,409 | 7/1980 | Strowe | 128/204.22 X |
| 4,230,097 | 10/1980 | Beaussant et al. | 128/1 A |
| 4,233,972 | 11/1980 | Hauff et al. | 128/205.25 X |
| 4,236,546 | 12/1980 | Manley et al. | 364/413 X |

*Primary Examiner*—Edward J. Wise
*Attorney, Agent, or Firm*—Cushman, Darby & Cushman

[57] ABSTRACT

A regulating apparatus for supplying a receiving unit with gas from a pressurized source comprises a valve piloted by a two-position solenoid valve controlled by a computer which receives data from pressure sensors. When used as a demand breathing regulator, the apparatus has a main valve for connecting a source of pressurized breathing gas and a breathing mask and a pilot diaphragm subjected to the pressure in the mask. A sensor senses the movements of a diaphragm or the pressure in the mask. A solenoid valve controls the pressure in a pilot chamber of the main valve.

10 Claims, 12 Drawing Figures

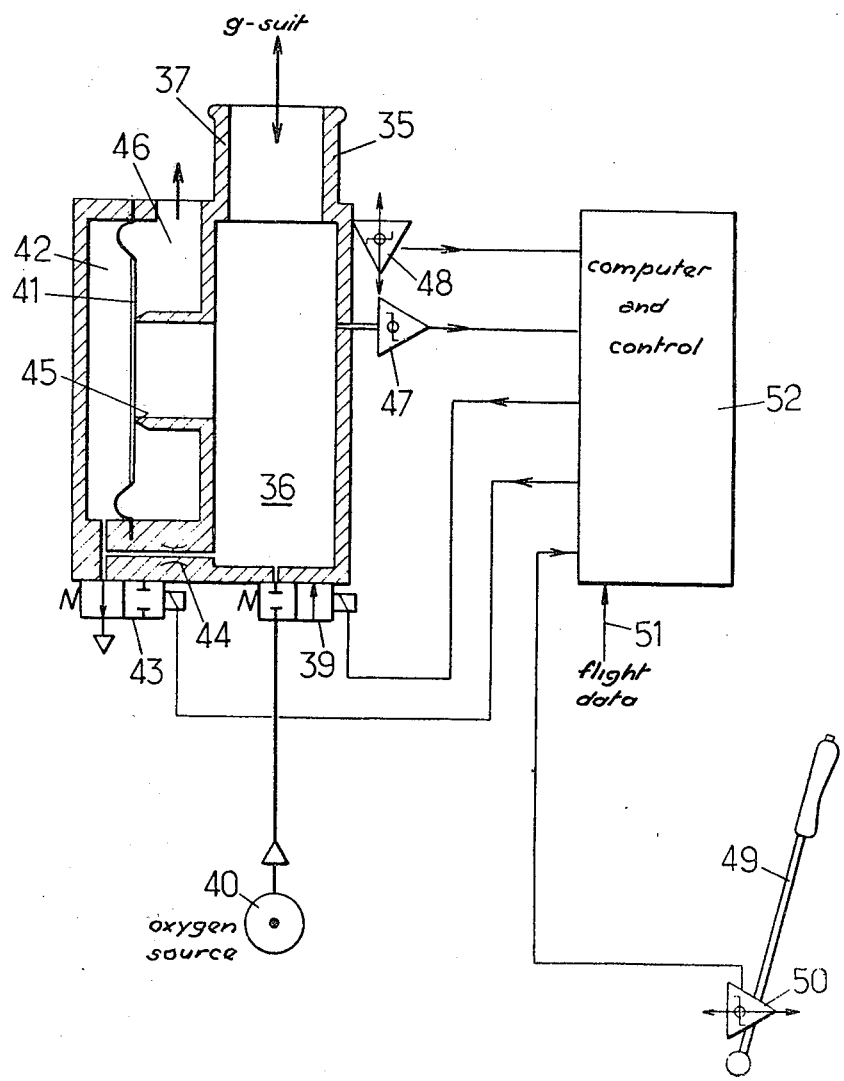

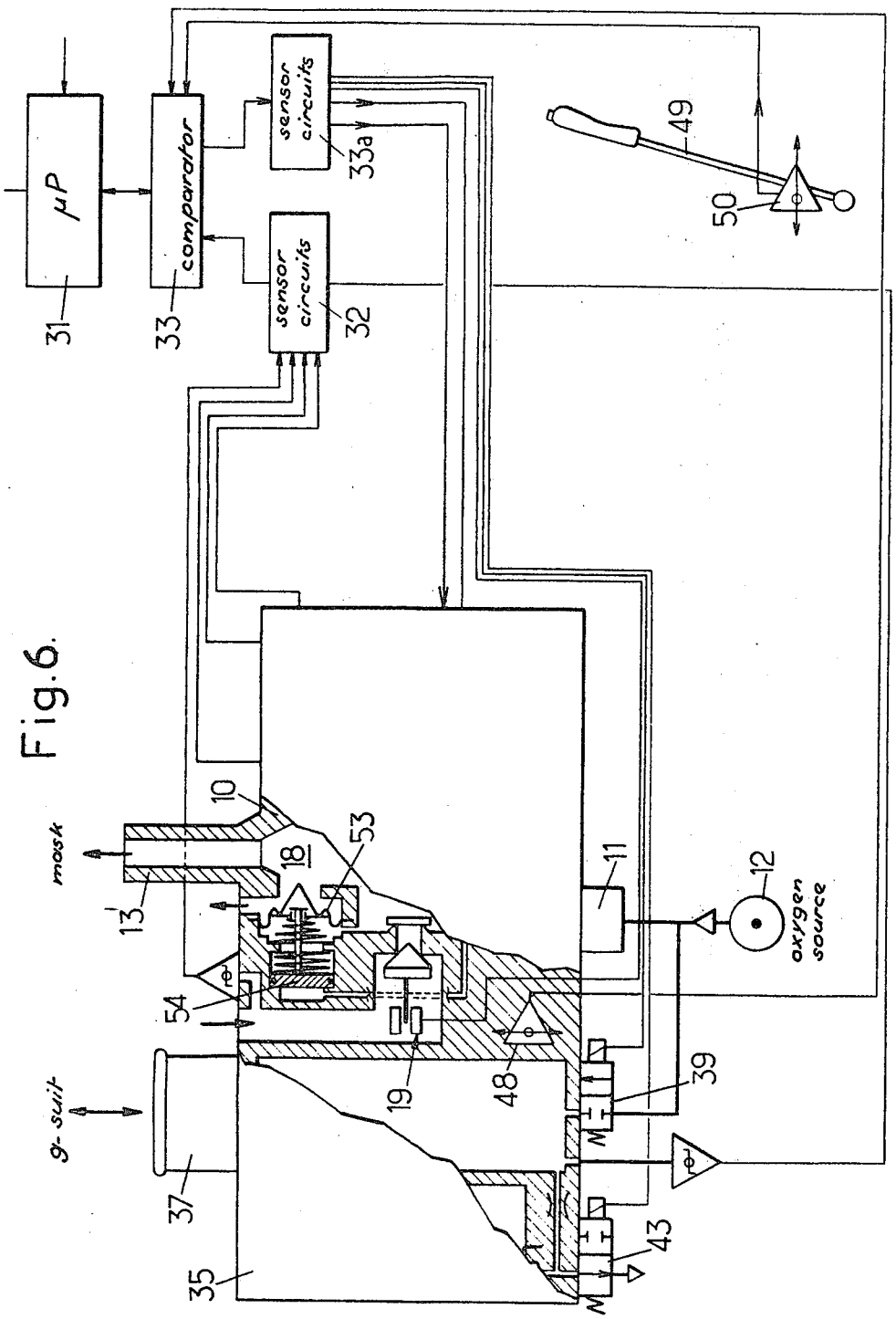

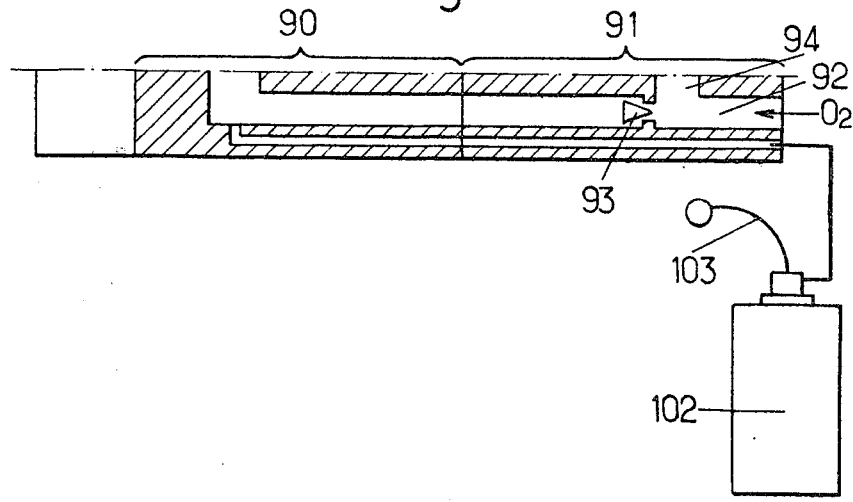
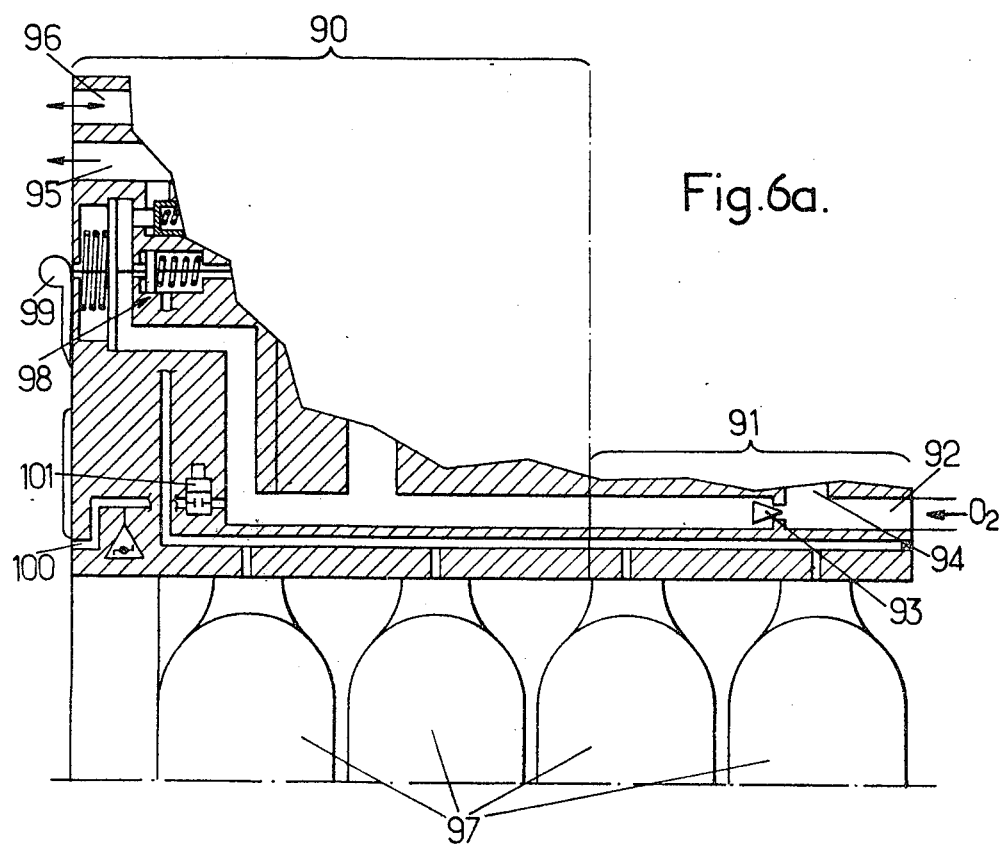

DEVICES FOR CONTROLLING GAS FLOWS

BACKGROUND AND SUMMARY OF THE INVENTION

The present invention relates to an apparatus for controlling a gas flow to a receiving unit from a pressurized gas source and it finds a particularly important application in the aeronautic field where such control devices are used to supply the crew members of fighter aircraft with a breathing mixture of appropriate composition and pressure and to supply gas inflating a high altitude or g-suit for avoiding distension of the rib cage if a pressurized breathing mixture is inhaled or for obviating the effects of acceleration.

At the present time, the devices or regulators for the above-mentioned applications are purely pneumatic in operation; they are consequently bulky, their characteristics are practically frozen and their response times are sometimes excessive.

It is an object of the invention to provide an improved apparatus which has a shorter response time and may be quite compact in design.

According to an aspect of the invention, there is provided an apparatus for regulating the gas flow to a receiving unit from a pressurized gas source, comprising a gas control device having a servo valve piloted by a solenoid valve which has two positions only and is controlled by computer means connected to receive input data from sensors carried by said device, in accordance with a stored program.

Due to the use of electronic components, the response time may be extremely low and may even approach a millisecond. The consumption may be very low, since balanced solenoid valves may be constructed requiring a control power less than 1 watt.

A pressure balanced valve suitable for use with high inlet pressure is described in copending U.S. patent application No. 145,841 for "Apparatus for creating gas flow cycles" of the Applicants.

A demand breathing regulator for use with a mask according to a first embodiment of the invention comprises a housing, a piloted main valve in the housing controlling communication between a source and a breathing mask, a pilot diaphragm subjected to the pressure in the mask, a pressure sensor in the mask, a solenoid valve for controlling communication between a control chamber for the main valve and a pressure relief outlet and electronic computer means controlling the solenoid valve responsive to the signals supplied by the sensor.

A g-valve, forming another embodiment of the invention, comprises a housing defining a chamber arranged for connection with a g-suit, fitted with a pressure sensor, a pressurized gas inlet electromagnetic valve in the chamber and an exhaust valve driven by the pressure in a control compartment connected by a calibrated leakage orifice to the chamber and by an electromagnetic valve to the atmosphere, and computing means receiving the signals from the pressure sensor and from an acceleration sensor supported by the case and controlling the electromagnetic valve as a function of the signals received.

The breathing regulator and the anti g-valve may be combined in a single unit; in addition to the above-defined functions, that unit may fulfil the functions of pressurizing the breathing mixture when the crew is subjected to acceleration and/or pre-inflating pockets of the g-suit at high altitude. These functions are fulfilled by a purely pneumatic installation in the system of French Pat. No. 77 20345.

The invention will be better understood from the following description of control devices which form particular embodiments thereof, given by way of examples.

SHORT DESCRIPTION OF THE DRAWINGS

FIG. 2 is a simplified diagram of a g-valve forming a second embodiment of the invention;

FIG. 2b is a detail view showing a variation of a fraction of the valve of FIG. 2a;

FIG. 6 is a simplified diagram of a device operating both as a breathing regulator and as a g-valve, with an interaction of the different functions.

FIGS. 6a and 6b show details of modifications of FIG. 6.

DETAILED DESCRIPTION OF PARTICULAR EMBODIMENTS

Figure 1A:
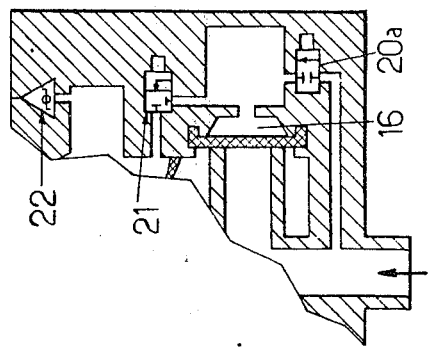
FIG. 1a is a partial representation of a modified embodiment.
Figure 1:
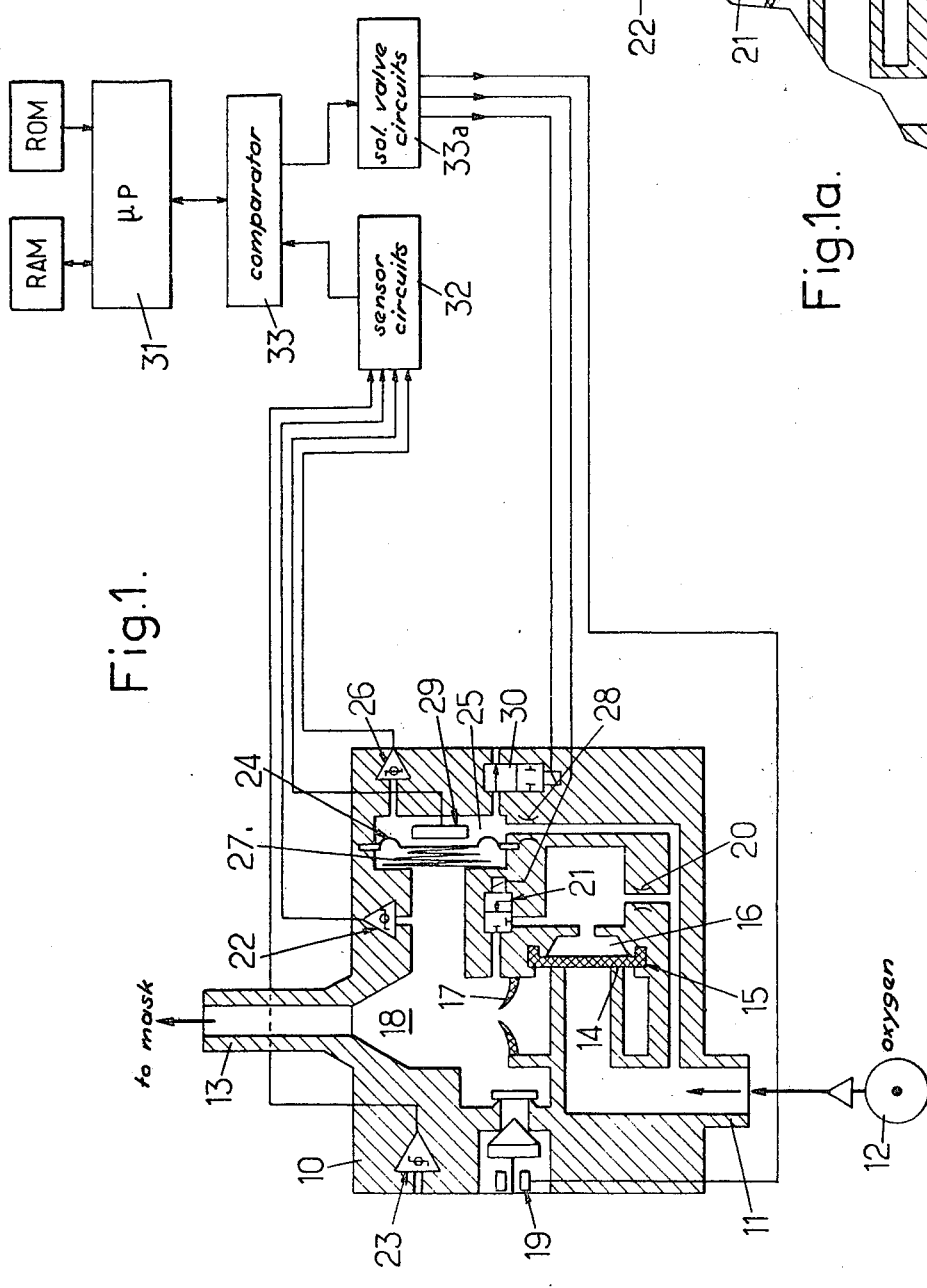
FIG. 1 is a simplified diagram of a demand regulator for operation at a moderate altitude, forming a first embodiment of the invention.

Referring to FIG. 1, there is shown a programmed regulator which comprises a pneumatic part and a programming and computing unit which will be successively described.

The pneumatic part comprises a conventional housing 10 provided with an inlet for connection to a pressurized oxygen source 12 and an outlet 13 for connection with the breathing mask to be supplied. The inlet is provided with a seat 14 for receiving a main valve 15, formed by a resilient diaphragm whose rear face is subjected to the pressure which prevails in a control chamber 16. In the path of the oxygen which flows out of the passage between the seat 14 and the main valve 15 there is placed a dilution nozzle 17 which opens into a demand chamber 18. An atmospheric air inlet in chamber 18 is controlled by a dilution valve 19 which will be described in more detail further on.

The oxygen source 12 will typically be a pressurized oxygen bottle or a liquid oxygen converter. However it may also be a system for O2 enrichment of atmospheric air: such a system providing O2-enriched air at a moderate pressure may be similar to that described in French Pat. No. 2,264,566 and designed for delivering N2-enriched air.

The opening and closing of main valve 15 are controlled by modifying the pressure in control chamber 16. Chamber 16 is continuously connected to inlet 11 through a restricted calibrated orifice 20 of typically 0.2 mm diameter. Communication of control chamber 16 with demand chamber 18 is controlled by means which hereby pilot the main valve.

Control of the communication between chambers 16 and 18 is not effected directly by opening a pressure-sensitive pilot valve as in conventional demand regulators. Chamber 16 is connected to chamber 18 by a solenoid valve 21 which, depending as to whether it is energized or not, separates chambers 16 and 18 or provide a passage between them.

Housing 10 is provided with a plurality of sensors for supplying the required data for elaborating the signals for controlling solenoid valve 21. In the embodiment illustrated, there is provided:

a sensor 22 for measuring the absolute pressure in the demand chamber 18 and the mask (for instance a piezo-electric sensor);

a sensor 23 sensing the outside pressure, a unit for detecting pressure variations in demand chamber 18.

The latter unit comprises a diaphragm 24 between the demand chamber 18 and a control compartment 25 having a pressure sensor 26. A return spring 27 biases diaphragm 24 away from chamber 18, towards a capacitive sensor 29. Compartment 25 is continuously connected by a calibrated restricted orifice 28, of typically 0.3 mm diameter, to inlet 11. A two-position solenoid valve 30 communicates compartment 25 to the ambient atmosphere or separates it from the atmosphere, depending on whether it is energized or not.

The computing and control unit comprises an analog or digital central processing unit 31. Use of digital means, typically a microprocessor, implies the addition of A/D converter means. The processing means comprises a ROM memory for storing the laws of variation of the pressure responsive to altitude to be achieved. Sensors 22, 23, 26 and capacity sensor 29 are connected to an electronic circuit board 32 for coupling with the microprocessor and the RAM memory thereof. The signals may be applied to a comparator 33 which also receives the data supplied by microprocessor 31. Another circuit board 33a supplies the power signals required for actuating the solenoid valves 21 and 30 and the proportional valve 19 depending on the results of the comparison.

As an example, the CPU 31 can be a microprocessor Z80 available from Zilog associated with a 2214 RAM memory and a 2708 ROM memory for storing the programs and calibration curves. The electric signals from pressure sensors 22, 23, 26, 29 are converted by respective A/D converters into 8-bits words. The outputs of the converters are stored in the RAM through a coupler and compared with the set values. The circuit board 33a for control of valves 19, 21 and 30 may include:

logic circuits delivering binary signals to solenoid valves 21 and 30, a D/A converter and a power amplifier delivering an analog signal to valve 19.

The dilution valve 19 will generally be an electrically controlled proportional valve defining a flow cross sectional area which depends on the value of the electric signal which it receives. Valve 19 may be of a type whose movable member assumes a position which depends solely on the electric current which flows in a control coil of the valve. The calibration curve will be stored in the ROM memory. It will not generally be necessary to provide the valve with a position detector, since the control system is in closed loop due to the provision of sensor 22.

The demand regulator operates as follows when a pressurized oxygen source 12 is connected to inlet 11 and the computer means 31 are operative. The solenoid valves are initially in the condition shown in FIG. 1 and are not energized by a current. Under the action of the inlet pressure, main valve 15 opens and oxygen flows into chamber 18 where the pressure is detected by sensor 22. An oxygen pressure builds up in control chamber 16 and closes back the main valve.

During very low altitude operation, dilution valve 19 is wide open and main valve 15 remains closed.

At altitudes where the regulator operates as a demand regulator with dilution, demand from the user creates a relative depression on demand diaphragm 24 which moves from its rest position and changes the flux between the capacitor probe 29 and a coating of diaphragm 24. From the output signals of capacitor probe 29 and sensor 22, also subjected to the relative depression, the computer means 31 elaborates an opening order which is applied to solenoid valve 21. The pressure drops in control chamber 16 and the main valve 15 opens to supply the mask with oxygen and dilution air fed through valve 19.

Dilution control valve 19 may be a throttle, controlled by an electro-magnet, a restrictor whose flow area is controlled by a step by step motor (rotary or linear), an electro pneumatic system, or any other controlled device.

During expiration, a relative over-pressure establishes in the breathing circuit. In response, sensor 22 sends to the computer unit data which result in closure of solenoid valve 21 and cut off of the oxygen flow.

Dilution will be progressively reduced as the aircraft gains altitude, since altitude increase will cause a modification of the signal supplied to the computer means by the external absolute pressure sensor 23.

From the moment when the information supplied by sensor 23 indicates that the mask should be supplied under pressure, the computer means control solenoid valves 21 and 30 so that the breathing mixture is delivered under a progressively increasing pressure, measured by sensor 22.

For more accurate control, the solenoid valves 21 and 22 may be energized by square electric pulses having a duty or aperture ratio variable by steps from 0 to 1, at a sufficient frequency for the pressure oscillations to be dampened in chambers 16 and 25.

The demand regulator may preferably be provided with a test system comprising an electrically controlled actuator which may exert a controllable action on sensor 23.

Determination of the regulator response to energization of the actuator indicates whether the dilution valve will correctly close when climbing in altitude and whether the altimetric overpressure will take place correctly.

The invention may be implemented in a regulator for very high altitudes, as well as to a regulator for average altitudes of the type shown in FIG. 1.

The valve in the embodiment shown in FIG. 1 may be a source of vibrations which are avoided in the modified embodiment shown in FIG. 1a, where the parts corresponding to those already shown in FIG. 1 bear the same reference numbers.

In the regulator of FIG. 1a a solenoid valve 20a is substituted for the restricted leak orifice 20 from chamber 16. This modification provides advantages. Since the demand depression is detected by sensor 22, the demand regulation is effected by opening and closing solenoid valves 20a and 21 which maintain a substantially constant pressure in pilot chamber 16 during inhalation. Since the restricted orifice is omitted, the risk of clogging is very much reduced. Removal of pilot diaphragm 24 constitutes a substantial simplification. The overpressure at high altitude may be metered by solenoid valves 20a and 21; the solenoid valve 30 of FIG. 1 is omitted along with pilot diaphragm 24.

The regulator of the invention may be programmed with any desired law of variation before each flight. In particular, the same regulator may be adapted to different types of flights by storing the proper variation law in the memory. Examples of typical uses are:

operation as a low altitude regulator for crew members provided with a breathing mask only;

operation as a high altitude regulator, for crew provided with a space suit.

In each situation, it is possible to easily select the characteristics, particularly the dilution curve and the overpressure in the mask, quite easily.

Figure 3:
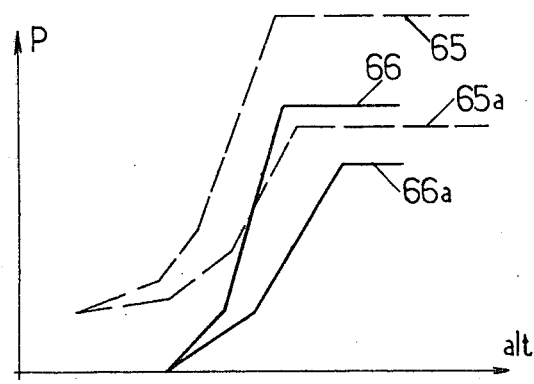

By way of example, FIG. 3 shows two sets of curves representing variations of the excess pressure at the outlet of the regulator plotted against the altitude for a low altitude regulator, one formed by curves 65 and 65a, the other by curves 66 and 66a. One or the other of the two sets is stored in memory and one curve or the other may be selected immediately before take-off depending on the mission.

Figure 4:
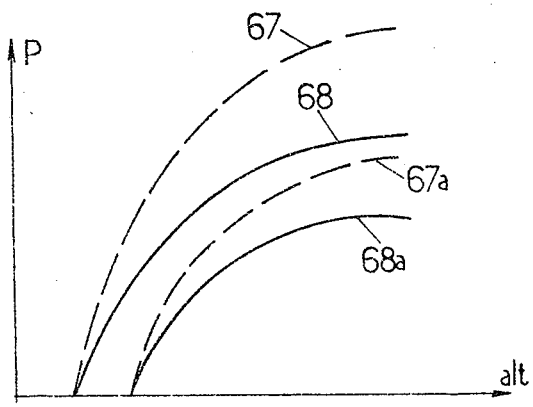

Referring to FIG. 4, there is shown two sets of overpressure diagrams for high altitude flight, one formed by curves 67 and 67a, the other by curves 68 and 68a.

For easier selection of a set of curves, each set may be programmed on an EPROM; then the appropriate curves are programmed into the computer by plugging in an appropriate board, selected among a plurality of available boards.

The programs written in the ROM of the computer may include test programs which check the most important functions before each flight mission, without it being necessary to remove the regulator from the plane. The corresponding program may be stored in a read-only memory plugged in solely for the time required for testing. It is for instance initiated by simply closing the outlet of the regulator. The test program may typically be the following:

low altitude mission: the computer simulates on sensor 23 (FIG. 1) the altitude corresponding to closure of the dilution (9 km for example). The computer then checks that the pressure supplied by the regulator at that altitude is within the tolerances and that the step by step motor for altimetric closure is operating correctly. To check rapidly the appearance of the altimetric overpressure, the computer simulates the signal which sensor 23 would supply at a given altitude (15 km for example), which causes a pressure rise in chamber 18 monitored by sensor 22.

high altitude mission: in the same way as before, a first altitude level is simulated, at which the computing unit checks the corresponding pressure, then one or more additional altitude levels, with correlative checking. If there is an operating failure, an alarm is triggered off.

Referring to FIG. 2, there is shown a second embodiment of the apparatus of the invention, constituting an anti-g valve. The valve again comprises a housing 35 in which there is provided a chamber 36 which a connection 37 enables to be placed in permanent communication with the inflatable pockets of protecting trousers. Housing 35 is provided with a first solenoid valve 39 for controlling communication between chamber 36 and a pressurized oxygen or air supply source 40 (typically at a pressure of from 1.4 to 14 bars). For instance the valve is open or closed depending as to whether it is supplied with electric current or not. A piloted exhaust valve is also provided for establishing and breaking the communication between chamber 36 and the ambient atmosphere. The exhaust valve comprises a movable wall 41 defining a control compartment 42 connected to atmosphere by a solenoid valve 43 and to chamber 36 by a calibrated restriction 44. Movable wall 41 forms a closing member and it is arranged to be applied against a seat 45 which delimits a passage communicating chamber 36 with an annular space 46 permanently open to atmosphere.

Housing 35 further carries a pressure sensor 47 (piezo-electric probe, for example) and an acceleration sensor 48, sensitive to the accelerations against which the crew is to be protected (accelerations whose direction is shown by a double arrow in FIG. 2).

The pneumatic part of the device, which has just been described, is associated with computer means 52, provided with a RAM memory and with a read-only memory for storing the programs determining the operation of the device. The computer means may be analog and process directly the signals received from sensors 47 and 48. However they are typically digital, and analog-digital converter means should then be provided.

The anti-g valve shown schematically in FIG. 2 is associated with a system which anticipates accelerations and initiates inflation of the pockets of the protecting trousers as soon as the controls of the aircraft equipped with the anti-g valve are placed in a position which will result in an acceleration. To this end, joystick 49 is provided with a stress sensor 50 whose output signals are applied to computer means 48, at the same time as signals 51 representative of the flight parameters.

The operation is then as follows, from the time when a rapid actuation of joy-stick 49 indicates that the aircraft is going to be subjected to an acceleration.

Sensor 50 sends a signal to the computer means which results in an order for opening solenoid valve 39 until a predetermined pressure, e.g. 10 millibars, is detected by sensor 47 in chamber 36 connected to the trouser pockets.

When the acceleration actually appears, it is measured by sensor 48. The signal received by computer means 52 is processed and re-opens electromagnetic valve 39 until the desired pressure is obtained in chamber 36. The relationship between pressure and acceleration is stored in the computer means 52.

When the acceleration decreases, computer means 52 causes solenoid valve 43 to open, which in its turn causes the opening of the main valve until the pressure in chamber 36 has decreased to the appropriate programmed value.

Finally, when there is no more acceleration, both solenoid valves are de-energized: valve 39 is closed and valve 43 is open.

Like the apparatus of FIG. 1, that of FIG. 2 admits of variations. For instance, a piloted valve assembly may be used of the same kind as on the regulator for removing the need for a solenoid valve 39 passing the whole of the gas flow required for supplying the anti-g trousers. However a calibrated leak for controlling such a valve involves considerable failure risks due to clogging of the calibrated leak hole, especially when the valve is fed with pressurized air from the compressor of a jet engine.

Figure 2A:
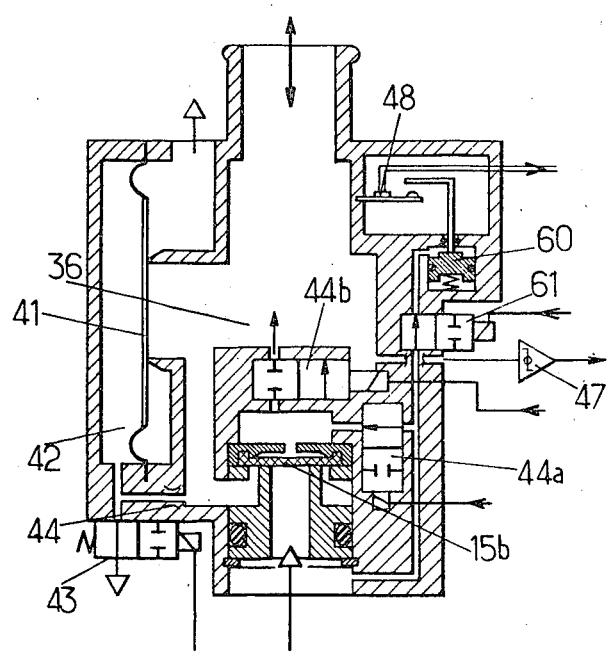
FIG. 2a is a simplified diagram of a modification of the valve of FIG. 2.
Figure 2B:
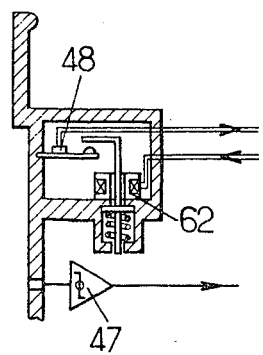

The difficulty is removed in the embodiment of FIG. 2a, where the piloted valve 15b is controlled by solenoid valves 44a and 44b which regulate the pressure prevailing in the valve control chamber, with the arrangement being comparable to that shown in FIG. 1a. The risk of clogging a restriction is much less in a piloted valve control hole, since it is of much larger size.

As an additional improvement, the anti-g valve shown in FIG. 2a may comprise a system for checking it in the factory, then on the aircraft, possibly before each flight. The valve comprises a member associated with the piezo-electric acceleration sensor 48 and simulating vertical accelerations applied to sensor 48. In the embodiment shown in FIG. 2a, the test system comprises an electro-pneumatic cell 60 which is energized by a valve 61 controlled by the computer. Cell 60 comprises a movable member formed for example by a deformable diaphragm carried by a caliper. When the cell is actuated, the caliper exerts a force, similar to an acceleration force, on sensor 48. Accelerations can be easily simulated typically up to 10 g. The test operation may be carried out entirely automatically, by programming the computing means of the apparatus.

The test system may include actuators other than a pneumatic cell. In the modified embodiment shown schematically in FIG. 2b (where the parts corresponding to those already described are designated by the same reference numbers), the actuator is a solenoid 62 comprising a coil in which the computer may cause an adjustable current to flow.

Whatever the embodiment, an alarm may be emitted if the relation between the pressure and the acceleration is outside a predetermined tolerance range.

In its use as an anti-g valve, the apparatus of the invention presents the additional advantage of easy modification to achieve different laws of variation of the pressure P supplied to the protection trousers as a function of acceleration. All that is required is to have stored the laws in a memory and to select one of them before a mission.

Figure 5:
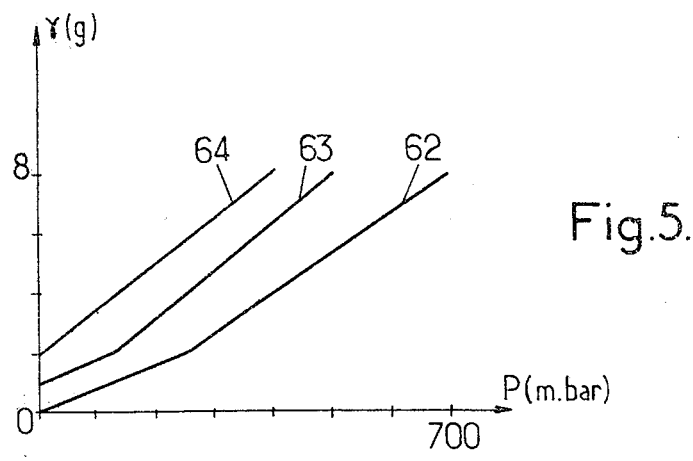
FIGS. 3, 4 and 5 are diagrams showing the variation of output pressures of the demand breathing regulator (FIGS. 3 and 4) and the g-valve (FIG. 5), according to different laws.

Three possible laws are illustrated in FIG. 5, by way of example.

Curve 62 corresponds to a variation law which may be qualified as "high" providing the crew with an excellent protection against acceleration, but at the price of pressures in the protection pockets which are painful.

Curves 63 and 64, which may be qualified as "low", impose lower stresses on the crew but, as a counterpart, do not give complete protection.

The curves may be linear (curve 64) or have bends (curves 62 and 63); they may extend from the point of origin (curve 62) or not (curves 63 and 64). They may consist of constant slope segments, or they may be represented by a curve with progressive slope variation.

The demand breathing regulator and the anti-g valve are advantageously implemented in a single unitary assembly, which may be of the kind shown in FIG. 6, for interaction between the members. The interaction is advantageously two-way:

- when the breathing regulator delivers a breathing mixture under pressure, it advantageously causes inflation of the pockets of the protecting trousers with air under slight pressure, so that protection against accelerations is obtained more rapidly when flying high above sea level;
- under acceleration conditions, the anti-g valve causes a slight pressure to appear in the mask, preventing the air-cells of the lungs from being compressed.

European patent application No. 0,000,312 describes a device which achieves interaction pneumatically. A more flexible and simple approach is possible in an apparatus according to the invention having computer means.

The assembly shown in FIG. 6 comprises a breathing regulator and an anti-g valve of the same construction as those shown in FIGS. 1 and 2 and the corresponding parts are designated by the same reference numbers and will not be described again. The regulator of FIG. 6 comprises, in addition to the parts already described, a valve 53 between chamber 18 and the atmosphere. Valve is maintained open by a piston 54 under the action of a spring, as long as the oxygen supply source is not connected to the regulator.

The apparatus operates as follows during acceleration: the signals successively delivered by sensor 50 and sensor 48 are processed by the computer means which controls solenoid valve 39 to pressurize the trouser pockets and controls solenoid valve 21 for supplying the mask up to the preprogrammed breathing pressure, at least if the acceleration exceeds a predetermined value. As soon as the required pressure is reached in the mask, the computer closes valve 21 based on information received from sensor 22 (FIG. 1). The pressures exerted on diaphragm 24 (FIG. 1) are automatically balanced due to the action of solenoid valve 30 controlled by the computer means. It is seen that an assembly is constructed which ensures all the required functions of the usual regulator and anti-g valves; switches may be provided to allow the pilot to override computer control and for instance to switch from normal supply to 100% oxygen supply.

Referring to FIGS. 6a and 6b modified embodiments are partially illustrated. They comprise an emergency supply in the case of bail out. In both cases, the housing carried by the air man seat comprises a regulator part 90 and an anti-g valve part 91, similar to those already shown in FIG. 6. A single inlet 92 is provided for connection with an oxygen source carried by the structure of the aircraft. The inlet supplies the anti-g valve directly by a branch 94 and the regulator through a nonreturn check valve 93. The outputs of the regulator and of the anti-g valve are shown respectively at 95 and 96.

An emergency source is formed, in the case of FIG. 6a, by oxygen cylinders 97. The cylinders are connected to a pressure reducing valve 98 which is opened manually or automatically by means of an actuator in case of ejection. There can be further seen in FIG. 6a a connection 100 provided with a solenoid valve 101 and intended for inflating the seal of a mask visor for flight at altitude.

In the case of FIG. 6b, the emergency source is formed by a chemical generator 102 brought into service by a pull action on a shear wire 103 and connected downstream of nonreturn valve 93.

In all cases, the computer means may be located in a case (FIG. 6b) coupled to the housing containing the pneumatic components and the sensors.

Figure 7:
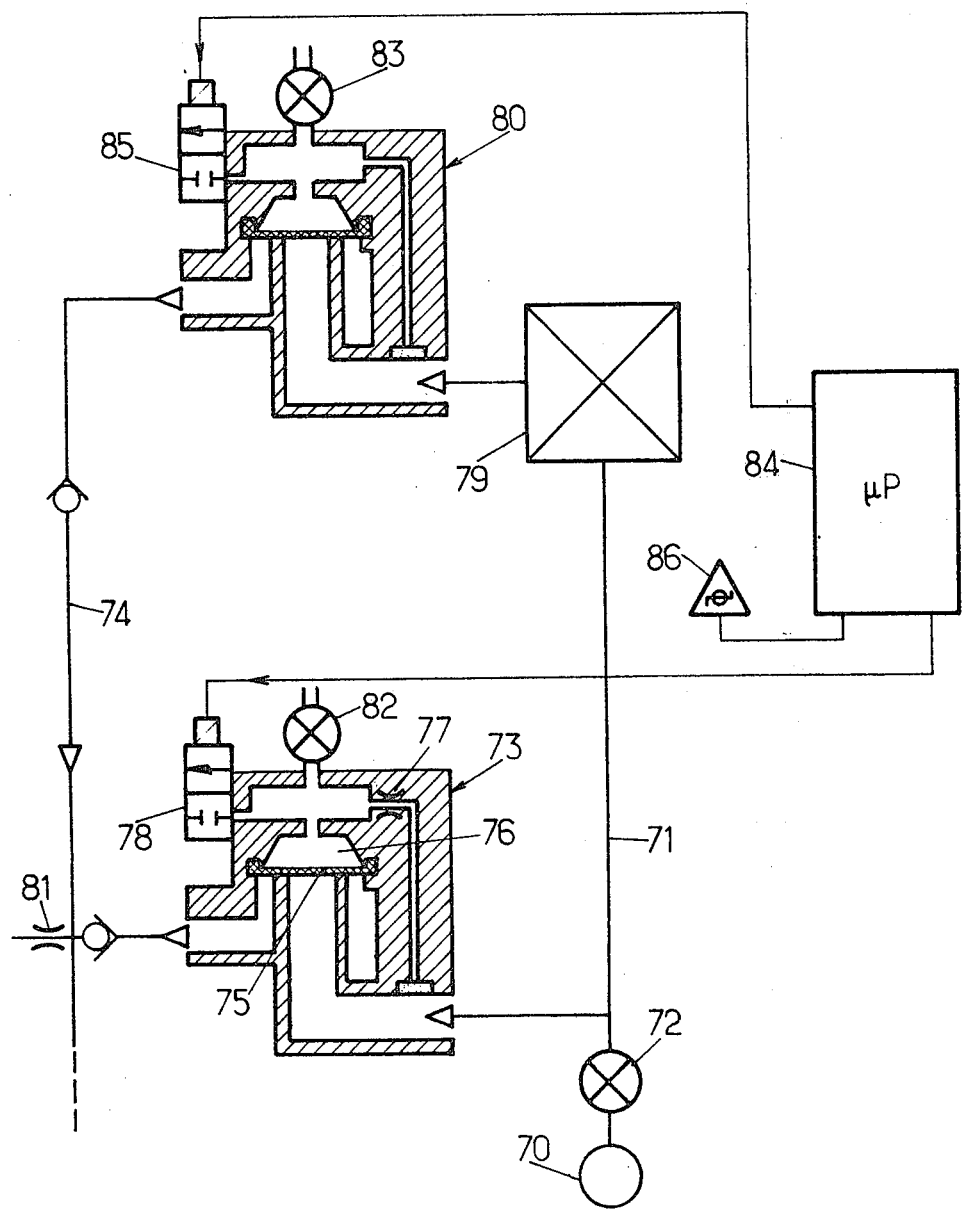
FIG. 7 illustrates another embodiment.

The oxygen distribution unit for commercial aircraft passengers shown in FIG. 7 is intended to fulfil several functions. It includes a general oxygen supply, at a pressure of 5 bars for example and must:

if there is a sudden loss of pressure in the cabin (due for example to breakage of a port-hole), supply a looped pipe to which individual breathing masks are connected, with oxygen at a pressure depending on the pressure drop in the cabin;

again if there is loss of pressurization in the cabin, open the valve boxes in which the individual masks are normally contained, supply, in response to a manual command, one or more masks used as first aid in case of indisposition of a passenger.

The unit shown in FIG. 7 fulfils all these functions. It comprises, from a general supply 70 (formed for example by a cylinder under a storage pressure of 5 bars), a supply pipe 71 having a stop-cock 72 which is open before each flight.

Pipe 71 supplies a first piloted block 73 for supplying, to loop 74 to which the masks are connected, the breathing gas at a pressure and with the flow corresponding to high altitude decompression. The piloted block 10 is of a construction similar to that shown in FIG. 1a: a valve-diaphragm 75 controlling the communication between pipes 71 and 74 is actuated by the pressure which reigns in a control chamber 76, on the one hand, connected to the intake by a constriction 77 and, on the other hand, able to be connected to the atmosphere by means of an electromagnetic valve 78.

Pipe 71 also supplies a low-pressure circuit comprising, in cascade, a pressure-reducer 79 and a piloted block 80 whose construction is the same as that of block 73. The pressure-reducer is for example provided to bring the pressure supplying driven block 80 down from 5 bars to 1.9 bars.

The pneumatic part of the installation is completed by a calibrated leak 81 opening into the cabin and allowing the pressure in loop 74 to drop when it is no longer supplied, and by push-button valves 82 and 83 for manual control of piloted blocks 73 and 80 in case of need. Additional supply connections with stop cock or valve may be provided in pipe 71 and at the outlet of pressure-reducer 79.

The unit comprises further a programming block 84 connected, on the one hand, to the electromagnetic valves 78 of block 73 and 85 of block 80 and, on the other hand, to a circuit 86 supplying a signal representative of the pressure in the cabin. This circuit may be formed by a piezo-electric sensor with temperature compensation circuit, for a range which in some cases will have to extend from −60° to +80° C.

The opening of the valves of the boxes containing the individual oxygen masks may be effected either electronically after emission of an order by programming block 84 or pneumatically by establishing the pressure in loop 74.

The automatic operation of the device in the case of a pressure drop in the cabin takes place in the following way.

In the case of decompression, for example by breakage of a port-hole, between 3500 and 6500 m, the programming block 84 reacts to the pressure signal supplied by sensor 86 by opening electromagnetic valve 78. A time-delay provided in the programming block maintains electromagnetic valve 78 open until a pressure of 5 bars is established in loop 74 for causing the valves of the boxes to open.

At the end of the time-delay, programming block 84 again closes electromagnetic valve 78 and opens electromagnetic valve 85 to supply the loop at 1.9 bars, this low pressure limiting the oxygen consumption.

In case of depressurization above 6500 m, programming block 84 acts solely on electromagnetic valve 78 and ensures the minimum flow corresponding to the altitude.

When the aircraft again reaches a low altitude, at 6000 m the programming block goes back to the supply pressure of 1.9 bars and at 3300 m it ceases to supply loop 74.

In case of a malfunction of the device, the crew may cause opening of the valves by means of valve 82, then supply the masks either by maintaining valve 82 actuated or (at average altitude) by maintaining solely valve 83 open.

Naturally, stop-cock 72 may be closed if necessary for safety reasons.

We claim:

1. In a transportation aircraft, an apparatus for distributing oxygen to passenger breathing masks, comprising:
a source of oxygen under pressure;
an oxygen distribution line;
a first gas flow control device having an inlet connected to said source and an outlet connected to said distribution line;
a pressure reducer having an inlet connected to said source and adapted to deliver oxygen at a predetermined reduced pressure at an outlet;
a second gas flow control device having an inlet connected to the outlet of said pressure reducer and an outlet connected to said line;
each of said gas flow control devices having a servo-valve controlling communication between the inlet and the outlet thereof and a pilot two-position solenoid valve for controlling said servo-valve in response to a control signal;
sensor means for sensing the pressure in the cabin of the aircraft and delivering a signal responsive of said pressure; and
computer control means connected to receive said pressure responsive signal for delivering a control signal to the solenoid valve of said first gas flow control device in response to said pressure responsive signal being lower than a threshold corresponding to a first predetermined altitude and for delivering a temporary control signal to the solenoid valve of said first gas flow control device and then a continuous control signal to the solenoid valve of said second gas flow control device in response to said pressure responsive signal being comprised between said first threshold and a second threshold corresponding to a second altitude lower than the first altitude.

2. Demand breathing regulator apparatus for controlling a respiratory gas flow to an inhalation mask from a respiratory gas source, comprising:
a gas flow control device having a housing provided with an inlet for connection to the gas source and an outlet for connection with the mask; a servo valve controlling communication between said inlet and said outlet and defining a control chamber in said housing, said servo valve being controlled by pressure variations in said control chamber; first sensor means arranged to deliver an electrical signal representative of the pressure variations at said outlet; and second sensor means arranged to deliver an electric signal representative of the pressure at said outlet; electrically controlled valve means operatively associated with said control chamber to control the pressure prevailing in said chamber;
and computer means connected to receive electrical input signals from said sensor means and to deliver electric control signals to said electrically controlled valve means in accordance with a stored program responsive to the input signals.

3. Demand breathing regulator apparatus according to claim 2, wherein said electrically controlled valve means comprises a first solenoid valve controlling communication between said control chamber and said outlet and a second solenoid valve controlling communication between said control chamber and said gas source.

4. Apparatus according to claim 2 or 3, wherein said servo valve comprises a diaphragm separating said control chamber from a space in said housing and a seat which separates said space into a zone receiving the pressure from the source and a zone connected to the mask by a dilution nozzle emerging into a chamber connected to the ambient atmosphere by a proportional electrically controlled valve controlled by said computer means.

5. Apparatus according to claim 2, wherein said computer means is arranged to further control g-valve means and to maintain a minimum output pressure of the g-valve.

6. Apparatus as in claim 2, wherein said electrically controlled valve means comprises an ON-OFF solenoid valve and said computer means is arranged to deliver electric control signals in the form of square pulses having a variable duty ratio.

7. Apparatus as in claim 2, further comprising a dilution nozzle in the gas path between said servo-valve and said outlet and an electrically controllable dilution control valve located on an airflow path from atmosphere to a location in said gas path immediately downstream of said dilution nozzle, wherein said computer means is arranged to deliver a control current to said dilution control valve which opens said dilution control valve by an amount in relation to the signal from said second sensor means which is in compliance with a stored program.

8. Apparatus according to claims 2 or 7, wherein said first sensor means comprises a control compartment formed in said housing, diaphragm means between said control compartment and said outlet, electrically controlled valve means operatively associated with said control compartment to meter the pressure prevailing therein, third sensor means arranged to deliver an electric signal representative of the pressure in said control compartment, and a capacitor probe for delivering an electric signal representative of the movements of said diaphragm responsive to demand and wherein said computer means are arranged to control the pressure in said control compartment responsive to the signal delivered by said third sensor means.

9. A g-valve apparatus for controlling a gas flow to a g-suit from a pressurized gas source, comprising:
a gas flow control device having a housing provided with an inlet for connection to the gas source and an outlet for connection with the g-suit and formed with an inner chamber in permanent communication with said outlet; servo exhaust valve means controlling communication between said chamber and atmosphere and piloted by the pressure which prevails in a control compartment connected by a calibrated leak orifice to said chamber; a first two-position solenoid valve located to control communication between said inlet and said chamber; a second two-position solenoid valve controlling communication between the control compartment and the ambient atmosphere; acceleration sensor means carried by the housing and arranged to deliver electrice signals representative of the acceleration impressed to the housing in a predetermined direction; and pressure sensor means carried by the housing and arranged to deliver electric signals representative of the pressure in said chamber;
and computer means connected to receive the signals from said sensors and arranged to deliver control signal to said solenoid valves as a function of the signals from said sensors and a stored program.

10. An apparatus according to claim 9, wherein said computer means is arranged for connection with a sensor mounted on the joy-stick of the aircraft equipped with the apparatus and for establishing an output pressure in said chamber as soon as the position of the joy stick of the aircraft anticipates an acceleration.

* * * * *